J. C. SNELLING.
LAUNCHING OF BOATS FROM SHIPS.
APPLICATION FILED JUNE 23, 1915.

1,216,868.

Patented Feb. 20, 1917.
6 SHEETS—SHEET 1.

Inventor,
John Charles Snelling.
By [signature]
Attorney

J. C. SNELLING.
LAUNCHING OF BOATS FROM SHIPS.
APPLICATION FILED JUNE 23, 1915.

1,216,868.

Patented Feb. 20, 1917.
6 SHEETS—SHEET 2.

Inventor,
John Charles Snelling,
By
Attorney

J. C. SNELLING.
LAUNCHING OF BOATS FROM SHIPS.
APPLICATION FILED JUNE 23, 1915.
1,216,868.
Patented Feb. 20, 1917.
6 SHEETS—SHEET 3.
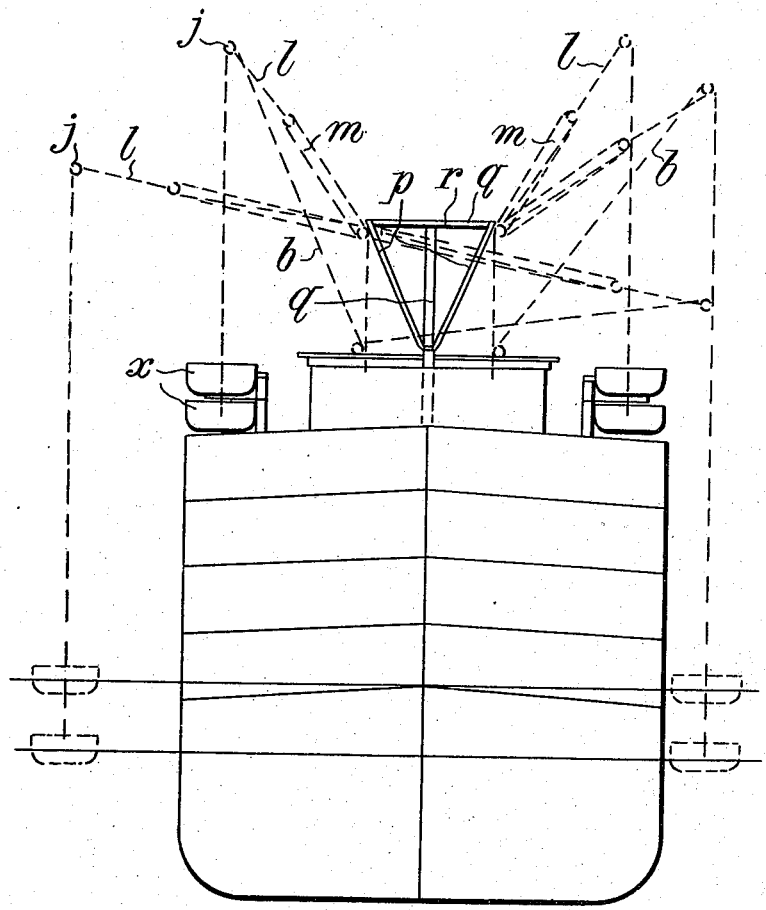
Fig. 3.
Inventor,
John Charles Snelling.
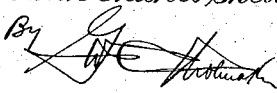
Attorney.

J. C. SNELLING.
LAUNCHING OF BOATS FROM SHIPS.
APPLICATION FILED JUNE 23, 1915.
1,216,868.
Patented Feb. 20, 1917.
6 SHEETS—SHEET 4.
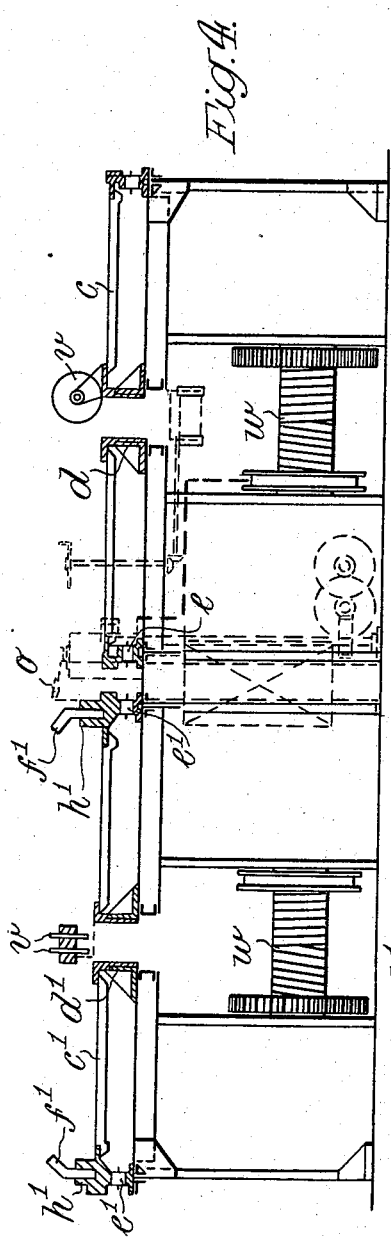
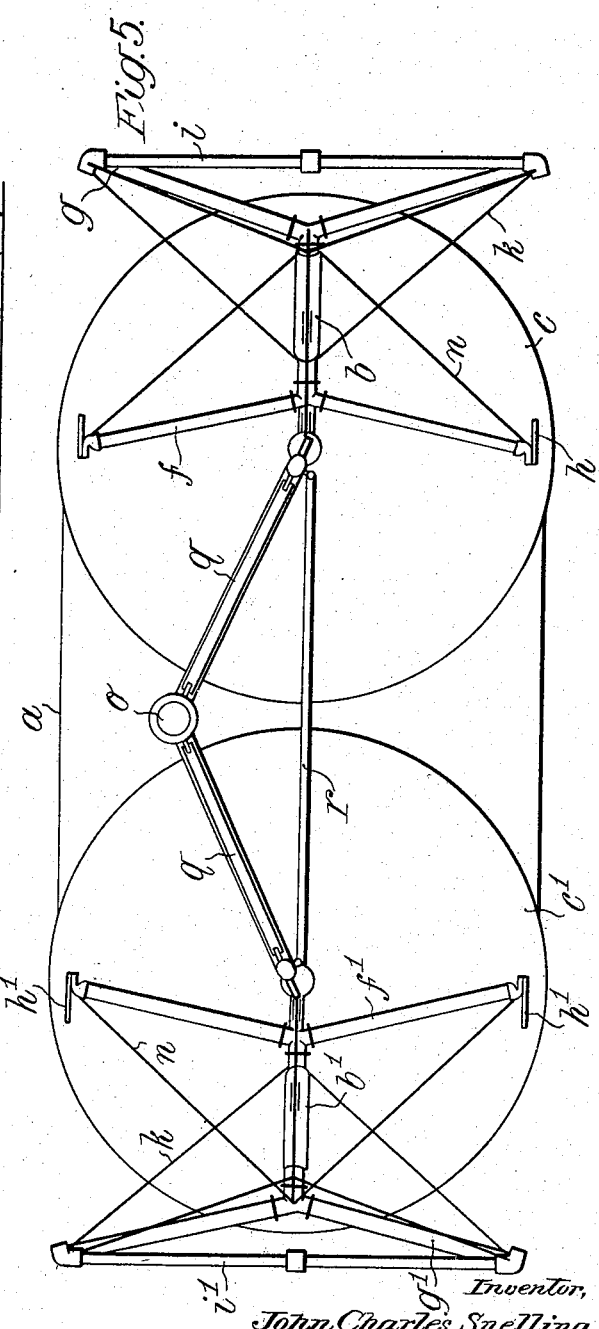
Inventor,
John Charles Snelling.
By
Attorney J. C. SNELLING.
LAUNCHING OF BOATS FROM SHIPS.
APPLICATION FILED JUNE 23, 1915.
1,216,868.
Patented Feb. 20, 1917.
6 SHEETS—SHEET 5.
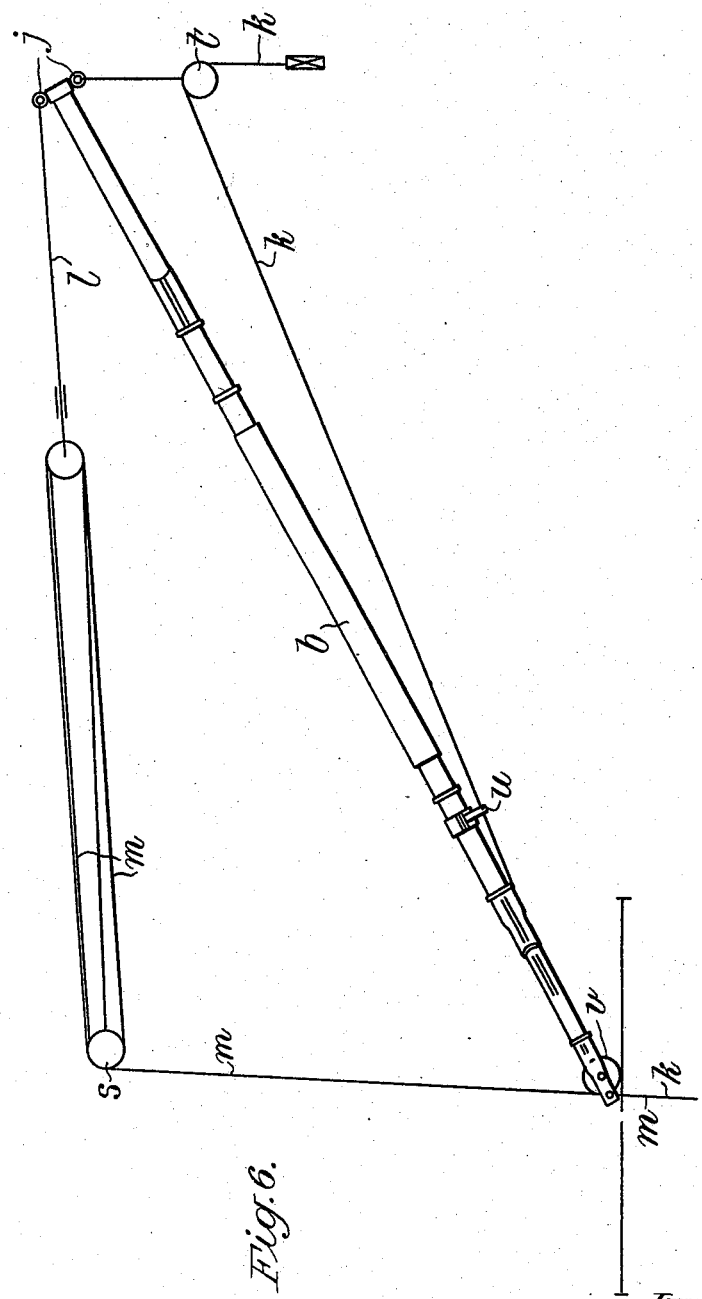
Fig. 6.
Inventor,
John Charles Snelling.
By 
Attorney

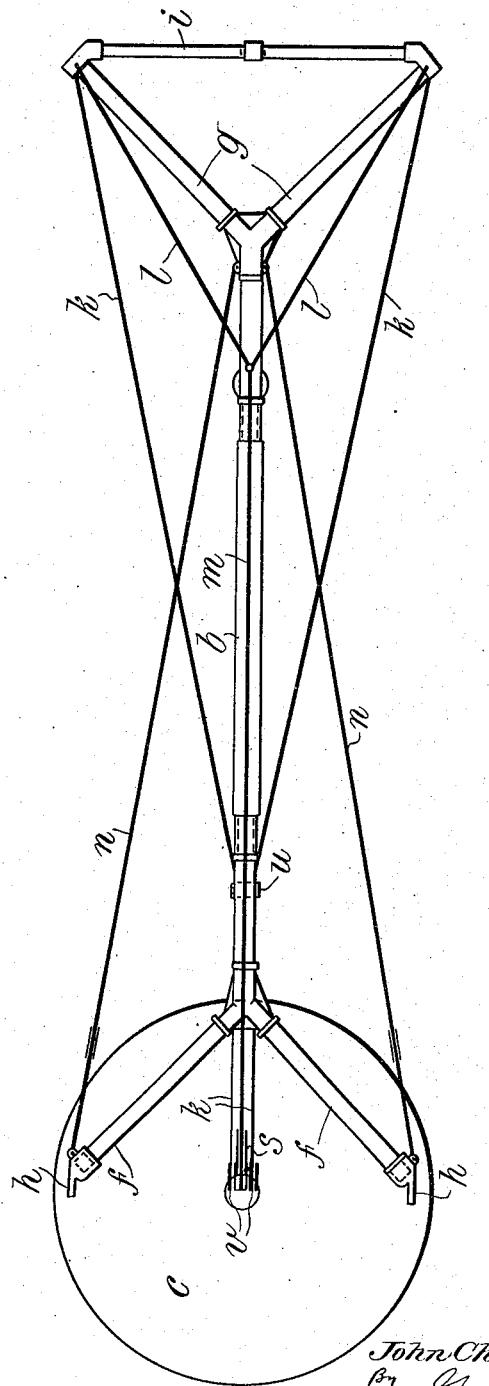

UNITED STATES PATENT OFFICE.

JOHN C. SNELLING, OF WANDSWORTH, LONDON, ENGLAND.

LAUNCHING OF BOATS FROM SHIPS.

1,216,868.   Specification of Letters Patent.   Patented Feb. 20, 1917.

Application filed June 23, 1915. Serial No. 35,827.

*To all whom it may concern:*

Be it known that I, JOHN CHARLES SNELLING, a subject of His Majesty the King of England, residing at Wandsworth, in the county of London, Kingdom of England, have invented certain new and useful Improvements in or Relating to the Launching of Boats from Ships, of which the following is a specification.

This invention relates to improvements in, or relating to, the launching of boats from ships, and it refers more specifically to launching gear of the kind in which the boats are stored in a plurality of different positions on the deck or other part of a ship each group being within reach of a common derrick which is mounted on a turntable.

Now according to the present invention each launching set comprises a double control box or platform having two turntables mounted thereon, each carrying a separate and independently controlled derrick so that all the boats within reach can be readily launched at will from either side of the boat as hereinafter described.

In the accompanying drawings with reference to which the present invention is hereinafter described:—

Fig. 3 is a diagrammatic end elevation;

Fig. 4 is a detail sectional view of the double control box or platform;

Fig. 5 is a corresponding plan view;

Fig. 6 is a detail side elevation of one of the derricks; and

Fig. 7 is a corresponding plan view.

Figure 1:
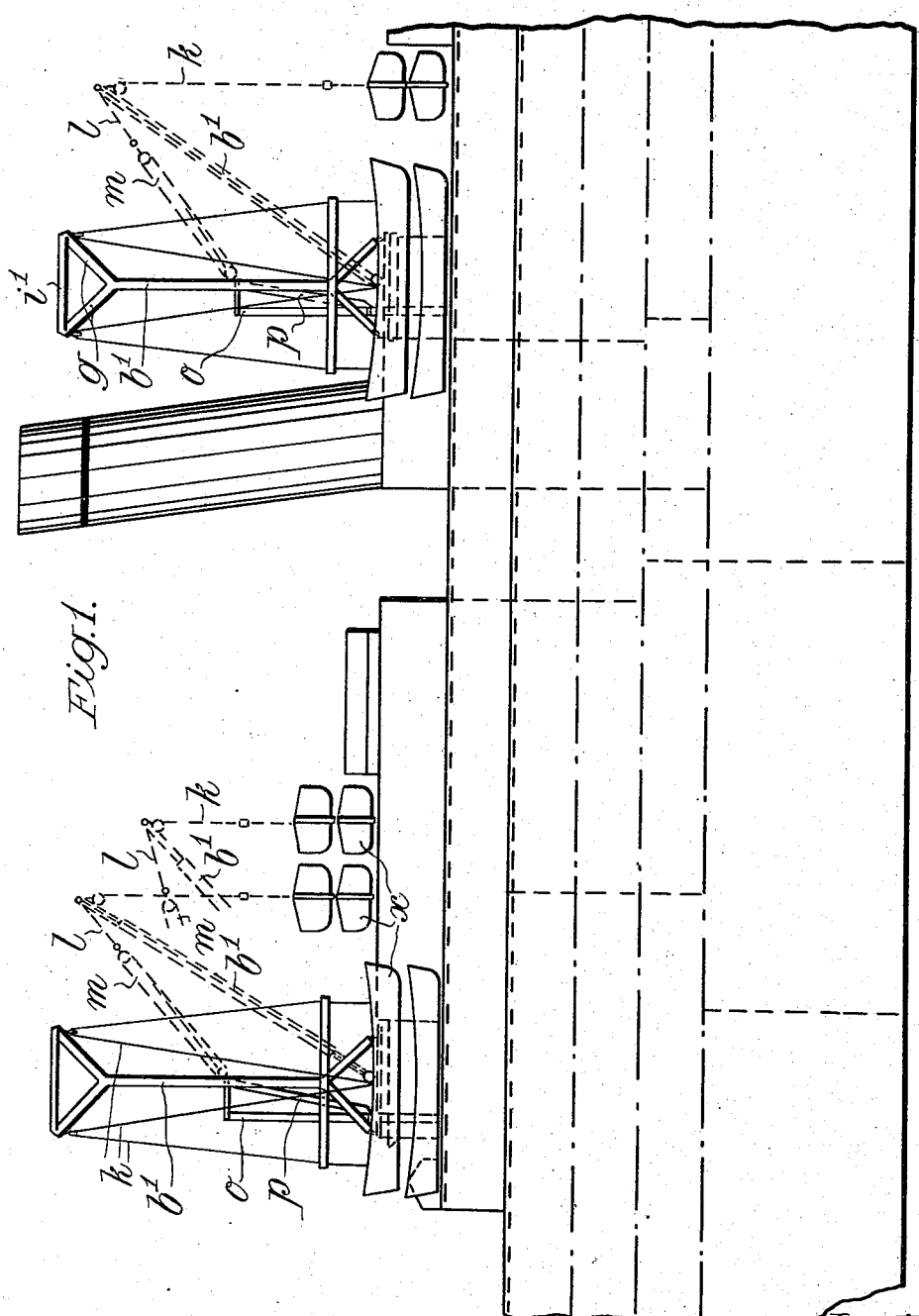
Figure 1 is a partial side elevation of a ship showing two sets of double derricks constructed according to this invention.
Figure 2:
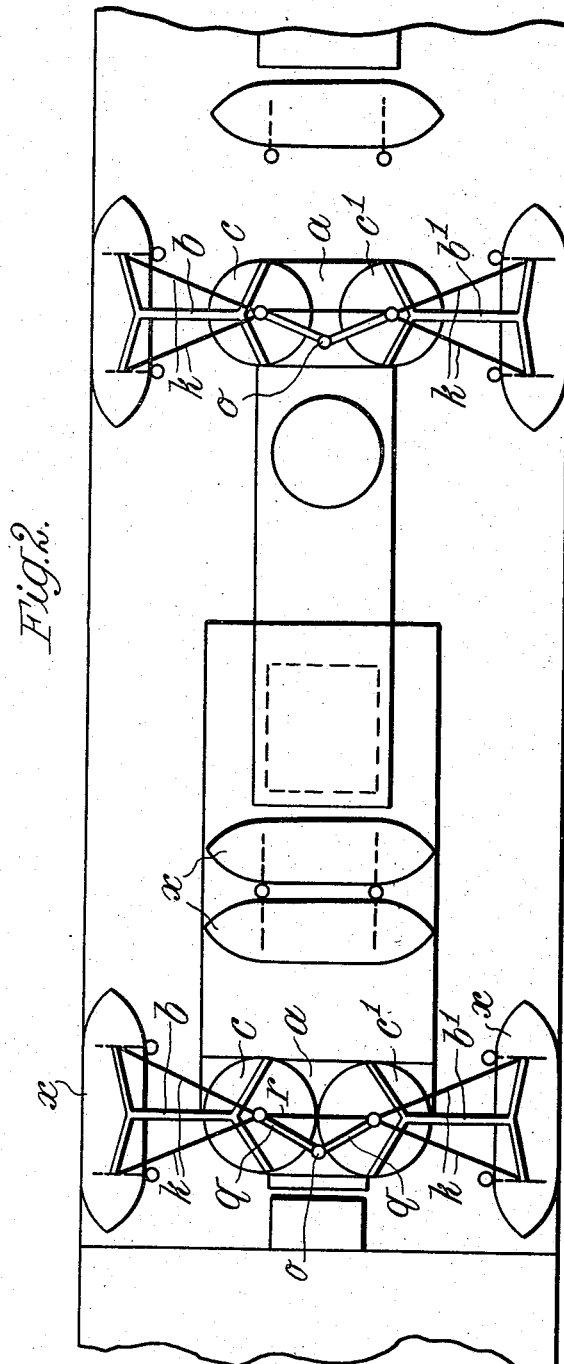
Fig. 2 is a corresponding plan view.

According to the present invention I provide for each launching set a double control box or platform $a$ upon which two derricks $b\ b'$ are mounted. The two platforms $c\ c'$ which surmount or form the top of each control resemble turn-tables and they are mounted side by side upon central bearing bushes $d\ d'$ and upon outer rollers $e\ e'$ as shown in Fig. 4.

The derrick arms $b\ b'$ are preferably formed of steel tubes and they are splayed out as shown at $f\ f'$ and $g\ g'$ to provide yoke pieces. The lower ends of the yoke pieces $f\ f'$ are connected at diametrically opposite points $h\ h'$ to their respective turn-tables $c\ c'$ and the upper ends of the arms $g\ g'$ are connected by steel cross braces $i\ i'$ and serve to support the shackles $j$ for the boat whips $k$ the topping bridle $l$ and the topping lift $m$. Steel wire stays or ties $n$ are provided to take the strains and these ties may conveniently be stretched or connected between the outer end of the derrick tube proper and the spaced ends $h$ of the splayed out lower arms $f$ one on each side.

The lifting strain of both derricks is adapted to be taken by a common derrick mast $o$ which is secured to the intermediate fixed portion of the control box or platform $a$. Supported from the base portion of this mast $o$ are a pair of upwardly, outwardly and forwardly extending auxiliary jibs or struts $p$ which are braced together at their upper ends by means of two other tie rods $q$ extending horizontally from the upper end of the mast $o$ and forming, with a further horizontal bar $r$ connecting the upper ends of the two jibs $p$ a triangle.

The topping lift $m$ for the derricks passes over sheaves $s$ provided at the upper ends of the auxiliary jibs $p$ and down to the winding drums which may be arranged within the control box and controlled in any convenient manner. The boat whips $k$ pass over sheaves $t$ through a fairlead $u$ and over sheaves $v$ to the winding drums $w$.

With the transverse arrangement of the control box and the derrick arrangement carried thereby it will be possible for all the boats $x$ to be handled and launched from either side by either of the derricks should one of them get damaged or be otherwise out of order.

What I claim as my invention and desire to secure by Letters Patent of the United States is:—

1. In the launching of boats from ships, the combination with a turn-table, of an inclined derrick arm provided with splayed terminal portions forming upper and lower yokes, the lower yoke being mounted on the turntable at diametrically opposite points and the upper yoke being provided with a connecting end brace, shackles arranged at the ends of the brace, a pair of boat whips suspended from the shackles, a bridle extending through the shackles, and a topping lift connected with the bridle.

2. In the launching of boats from ships the combination with a platform, a pair of turntables surmounting the platform, inclined derrick arms mounted on the turntables and located opposite each other, a mast mounted on the platform beyond the coincident planes of the centers of the turntables, inclined auxiliary jibs connected at their lower ends with the mast and terminating at their upper ends above the centers of the turntables, a brace connecting the upper ends of the jibs with each other, diverging braces connecting the upper ends of the jibs with the mast and topping lifts connected with the jibs and the derrick arms.

3. In the launching of boats from ships, the combination with a platform, of a pair of turntables surmounting the platform, inclined derrick arms provided at their upper and lower ends with yokes, the lower yokes being mounted upon the turntables and the upper yokes having connecting braces, a mast common to both derrick arms and mounted upon the platform between the turntables and beyond the plane which intersects the centers of the turntables, inclined diverging jibs extending from the mast to points above the center of the turntables, braces connecting the upper ends of the jibs with each other and with the mast, bridles supported by the connecting braces of the said upper yokes, boat whips arranged in pairs and carried by one set of bridles, and topping lifts connected with the other set of bridles and the jibs.

In testimony whereof I have signed my name to this specification.

JOHN C. SNELLING

Copies of this patent may be obtained for five cents each, by addressing the "Commissioner of Patents, Washington, D. C."